United States Patent [19]

Tokuno

[11] Patent Number: 5,761,849

[45] Date of Patent: Jun. 9, 1998

[54] STRUCTURE FOR OPENING DOORS OF VEHICLES AT UPPER AND LOWER SIDES OF THE DOORS

[76] Inventor: Toshiaki Tokuno, 409, Kitazukamachi-nishi, Kanazawa-shi, Ishikawa, Japan, 920-03

[21] Appl. No.: 805,434

[22] Filed: Feb. 25, 1997

[30] Foreign Application Priority Data

Sep. 26, 1996 [JP] Japan .................. 8-0277058

[51] Int. Cl.⁶ .................................. E05D 15/50
[52] U.S. Cl. .................................. 49/193; 16/268
[58] Field of Search ............... 49/381, 382, 192, 49/193; 16/268, 269; 296/57.1, 146.11, 146.12, 26

[56] References Cited

U.S. PATENT DOCUMENTS

| | | | |
|---|---|---|---|
| 1,395,629 | 11/1921 | Breakfield | 296/57.1 |
| 2,203,049 | 6/1940 | Goserud | 16/268 |
| 2,712,915 | 7/1955 | Cohen et al. | 16/268 X |
| 2,912,568 | 11/1959 | Winkler | 16/268 X |
| 3,656,801 | 4/1972 | Doutt et al. | 296/57.1 |
| 4,310,194 | 1/1982 | Biuer | 296/26 X |
| 5,518,286 | 5/1996 | McCormack | 296/57.1 |

FOREIGN PATENT DOCUMENTS

| | | | |
|---|---|---|---|
| 1508620 | 1/1968 | France | 49/193 |
| 2275622 | 1/1976 | France | 16/268 |
| 4238982 | 8/1992 | Japan | 49/382 |
| 510464 | 8/1939 | United Kingdom | 296/57.1 |

Primary Examiner—Jerry Redman
Attorney, Agent, or Firm—Darby & Darby

[57] ABSTRACT

A structure for opening doors of vehicles at upper and lower sides of the doors, provided for opening a door of a vehicle, which covers an opening formed on a vehicle, at and about the upper side or the lower side of the opening to open and close the opening, comprising a hinge assembly including a pair of a female hinges and a male hinges, the female hinges having a cylindrical body with an insertion part extending through the periphery of the cylindrical body in its axial direction, the male hinges having a rotation member inserted into each female hinge through the insertion part to be rotatable on the inner peripheral surface of the female hinge and a support supporting the rotation member, the hinge assembly being disposed between near the opening and the door at their upper and the lower sides, and a locking mechanism provided between near the opening and the door at their upper and lower sides and having a rotation axle extending in the direction of a rotation axis of the hinge assemblies at the upper and the lower sides of the door and the opening, the locking mechanism holding the rotation member of the male hinge rotatably in the female hinge of the hinge assemblies.

6 Claims, 6 Drawing Sheets

STRUCTURE FOR OPENING DOORS OF VEHICLES AT UPPER AND LOWER SIDES OF THE DOORS

BACKGROUND OF THE INVENTION

1. Field of the Invention

The present invention relates to a structure for supporting a vehicle's door, which covers an opening formed on the vehicle, as enabling the door to be opened at the upper side and the lower side of the door.

2. Prior Art

Vehicles, particularly, automobiles; such as a station wagon, a three-door hatchback, and median or small van type of cars having a single inner space (one-box cars) or having two compartments inside (two-box cares); large vans for transporting various loads; and buses are provided at their rear side or lateral side with an opening that is covered with a door, which is supported as enabled to be opened and closed and is used for allowing persons to get on and off the vehicle and for placing loads on or removing loads from the vehicle. Conventionally, the doors are mounted as enabled to be opened or closed by a hinge that is provided generally either at the left or the right side of the opening, or otherwise at the upper side of the opening. Other opening and closing structures are a sliding door and double doors, the latter being centrally openable about vertical or transverse axes.

However, the conventional doors mounted on the vehicles as enabled to be opened and closed are not changeable or adjustable of the direction of opening and closing the doors and trouble users occasionally depending on uses. Moreover, although the vehicles' door is designed generally to have high strength for improving strength of the vehicles body when the door is closed, they practically serve merely as a cover for the opening and have no merits after they are opened. For example, the rear door of the one-box car which may be in the type of three-door hatchback or medium or small van is opened generally at the lower side about a hinge provided at the upper side of the rear door and does not at all have additional or separate services or merits after the rear door is swung up to be opened.

SUMMARY OF THE INVENTION

The inventor has zealously studied the above problems and achieved the present invention which is a structure for opening doors of vehicles at upper and lower sides of the doors, namely, a structure for opening a door, which covers an opening formed on a vehicle, at and about the upper side or the lower side of the opening to open and close the opening, comprising a hinge assembly including a pair of a female hinge and a male hinge, the female hinge having a cylindrical body with an insertion part extending through the periphery of the cylindrical body in its axial direction, the male hinge having a rotation member inserted into the female hinge through the insertion part to be rotatable on the inner peripheral surface of the female hinge and a support supporting the rotation member, the hinge assembly being disposed between near the opening and the door at their upper and the lower sides, and a locking mechanism provided between near the opening and the door at their upper and lower sides and having a rotation axle extending in the direction of a rotation axis of the hinge assemblies at the upper and the lower sides of the door and the opening, the locking mechanism holding the rotation member of the male hinge rotatably in the female hinge of the hinge assemblies.

DETAILED DESCRIPTION OF THE INVENTION

Figure 1A:
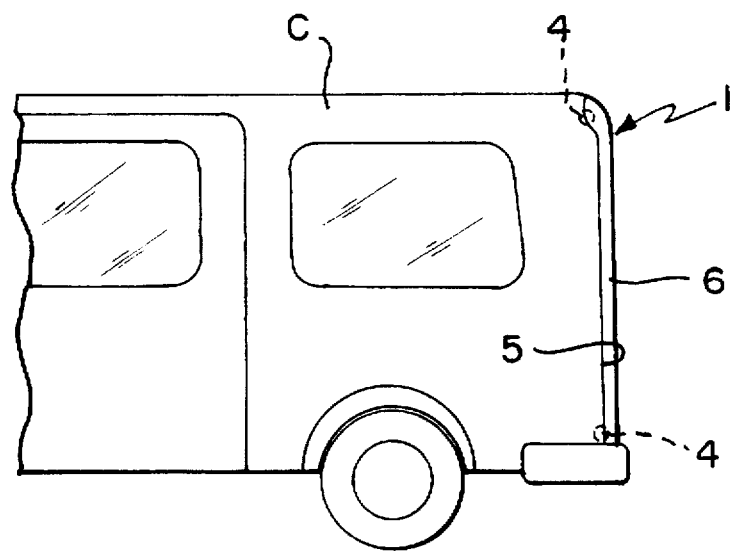
FIG. 1 (a) is a schematic side view showing an example of a structure for opening and closing a vehicle's door at the upper and lower sides according to the present invention, and FIG. 1(b) a schematic rear view of FIG. 1(a).
Figure 1B:
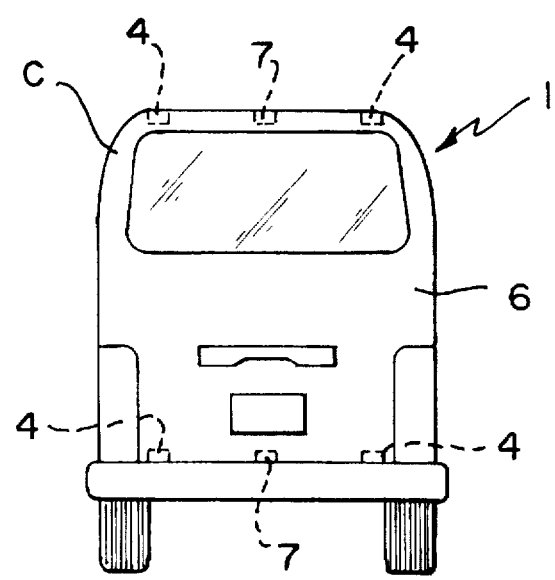

The door described herein is a member for covering, opening and closing the opening formed on the vehicle. The opening basically means the one provided at the rear of a vehicle or may be an opening formed at a lateral side of a bus. The vehicles may include any cars, such as a camper, which is removed by a trailer, as well as the automobiles such as the foregoing one-box car. Shapes and structures of the doors are not limited to any predetermined ones. Since the door in the present invention is adapted to be opened at the upper and the lower sides, the shapes and structures of the door are designed preferably in consideration of uses of the door as a floor, a slope or steps particularly when the door is used as opened at the upper side.

Vehicles generally have windshields, i.e., glass on the doors through which views are obtained. A protector for the windshields may be used and provided in such manner that the protector is slidable on the inner side of the door so that it is slided by gravity to cover the windshield when the door is opened, and automatically returns by gravity to an original or accomodation position when the door is closed. The protector may be electrically operated like a customarily usable "power window" or may use a structure of a manual operation for the protector.

The female hinge is a hinge member comprising a cylindrical body which has on a part of its periphery an insertion bore extending through the periphery of the cylindrical body in its axial direction. The insertion bore may extend from end to end in the axial direction of the cylindrical body or terminate before both ends or one end thereof. The female hinge is basically cylindrical and necessarily needs to have an inner peripheral surface having a round cross-section. Thus, shapes of the outer peripheral surface of the female hinge are not limited to any particular ones but may use a quadrangular prism having a round hole.

The male hinge is a combination of a rotation member, which is inserted into the female hinge through the insertion bore to rotate on the inner peripheral surface of the female hinge, and a support supporting the rotation member. Usable as the rotation member are those so structured as not disconnected radially from the inside of the female hinge at its part other than the insertion bore. Supporting the rotation member by the support may be provided by fixing the support at both ends, one end or the central part of the rotation member. Depending upon the positions where the support is fixed, the female hinge needs to have an additional slit which extends from the insertion bore circumferentially of the female hinge and allows the support to pass through. Each pair of the male hinge and the female hinge constitutes a hinge assembly. The hinge assemblies are disposed between an opening and a door formed at the rear of vehicles at the upper and lower sides of the opening and the door to enable the door to be swung as opened and closed.

The locking mechanism is provided laterally in the axial direction of the hinge assembly, which disposed between the opening and the door at the rear of vehicles at the upper and lower sides of the opening and the door, and is so structured to allow the rotation member of the male hinge to be held rotatably in the female hinge of the hinge assembly. In other words, the locking mechanism holds the rotation member of the male hinge as not escaping from the female hinge through the insertion bore while being rotatable in the female hinge, so that the locking mechanism locks the door as not detached from the opening. Hence, when the locking mechanisms at the upper and the lower sides of the door are set in a locking state, the door is held to be closed. When any one of the locking mechanisms is released from the locking state, the door is openable at the side, where the locking mechanism is unlocked, about the other side where the locking mechanism is in the locking state, whereby enabling to freely select any desired from the upper and the lower side opening operations.

Releasing the locking mechanism from the locking state may be performed by a remote control using a wire or by an electrical operation using an electromagnet. Methods for the releasing operation are not limited to any particular ones. A structure of the locking mechanism may include a pin provided at the opening on the vehicle body and an engaging member provided at the door to be engageable with the pin. A door of a large vehicle is hard to be opened and closed at the upper side of the door and may use a wire connected to the door's upper side for opening and closing the door. Based on this feature, the door which is closed by pulling in the wire to be in a locking state may be opened at the lower side of the door. Door opening and closing means with a wire may be realized by an electrical operation using a wire winding device on the vehicle body or by a manual operation.

EMBODIMENTS

Next, the present invention will be further detailed with referring to specific examples of the invention shown in the drawings.

FIGS. 1(a) and (b) illustrate an example of a structure 1 for opening a door of vehicles at the upper and the lower sides of the door according to the present invention. A hinge assembly 4 including a female hinge 2 and a male hinge 3 is provided between an opening 5 formed at the rear of the vehicle C and a door 6 covering the opening 5 as openable and at the upper and the lower sides of the opening and the door, with two hinge assemblies 4 being disposed at each of the upper and lower sides and a locking mechanism 7 interposed centrally between the hinge assemblies.

Figure 2A:
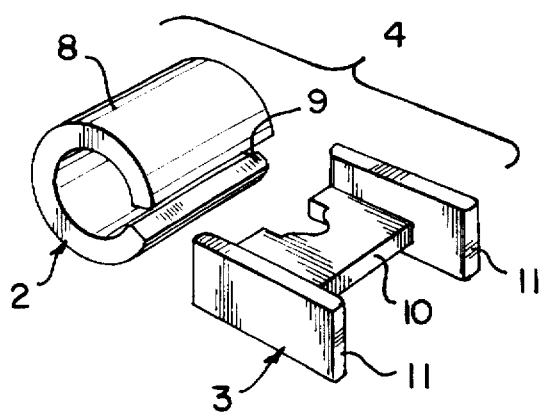
FIG. 2(a) is a perspective view of hinge assemblies of the door opening and closing structure shown in FIG. 1, FIG. 2(b) a perspective view showing a further example of the hinge assemblies, FIG. 2(c) a further modified example of the hinge assemblies, FIG. 2(d) a further example of the hinge assemblies, FIG. 2(e) a perspective view of a locking mechanism, and FIG. 2(f) a perspective view of a further example of the locking mechanism.
Figure 2B:
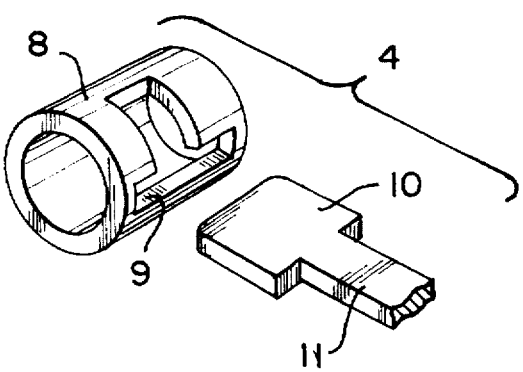
Figure 2C:
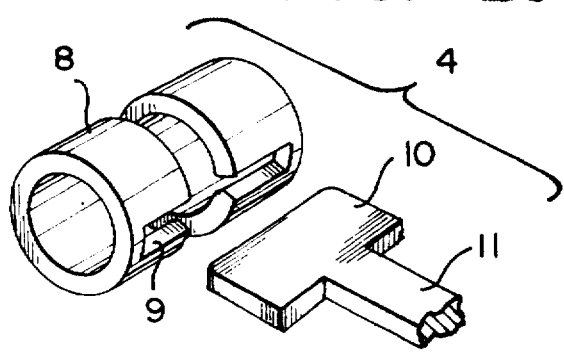

As seen in FIG. 2(a), the hinge assembly 4 is a pair of the female hinge 2 and the male hinge 3. The female hinge 2 is made of a cylindrical member 8 having an insertion bore 9, which extends through a part of the peripheral surface of the cylindrical member 8 in its axial direction. The male hinge 3 has a rotation member 10, which is inserted into the cylindrical member 8 through the insertion bore 9 to be rotatable on the inner peripheral surface of the cylindrical member 8, and a support 11 supporting the rotation member 10. The hinge assembly 4 may be so structured as shown in FIGS. 2(b) to 2(d). The hinge assembly 4 in FIG. 2(d) is adapted to be applied, at the bottom part of the inner peripheral surface of the cylindrical member 8, with load of the door 6.

Figure 2E:
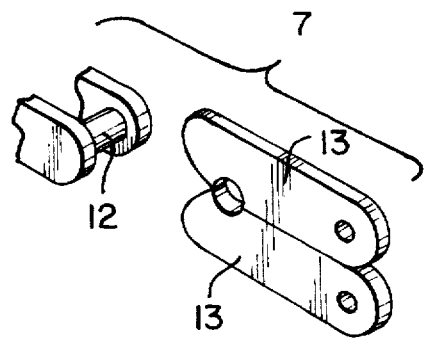
Figure 2D:
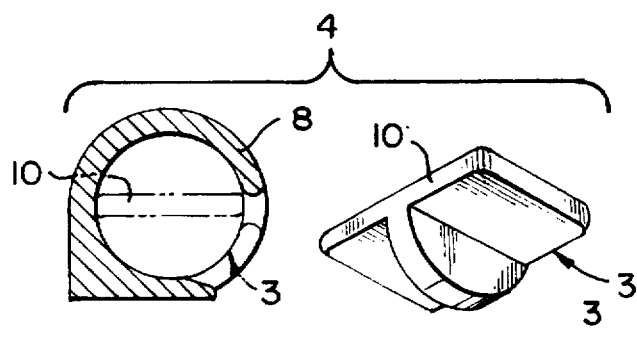
Figure 2F:
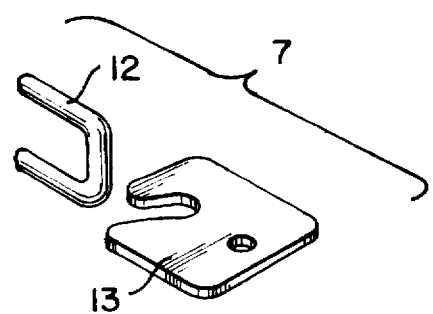

A locking mechanism 7 comprises a pin 12 and an engaging member 13, which is engageable with the pin 12 to be rotatable about the pin 12, as shown in FIG. 2(e). The engaging member 13 includes two nipper elements urged by a spring in the direction of nipping. The engaging member 13 is released from a locking state against the spring by a remote control using a wire, and is brought into engagement with the pin 12 after the end of the engaging member 13 is fit to the pin 12 to allow the pin to be brought between the nipping elements and open them against the spring. The locking mechanism is similar to those for a door generally put in use now. The locking mechanism 7 may use the structure shown in FIG. 2(f) or any other features that allows rotation in the locking state.

Figure 3A:
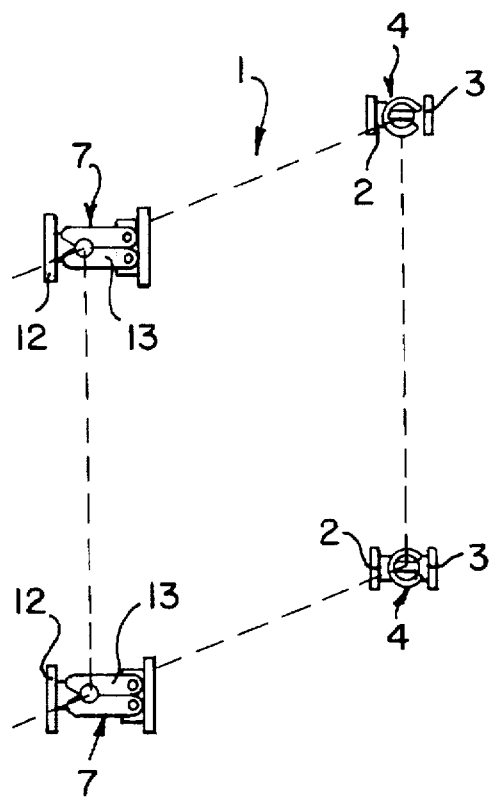
FIG. 3(a) is a schematic diagram showing the door opening and closing structure shown in FIG. 1 with the door being closed, and FIG. 3(b) a schematic diagram showing the door being opened at the upper side after the upper locking mechanism is released.
Figure 3B:
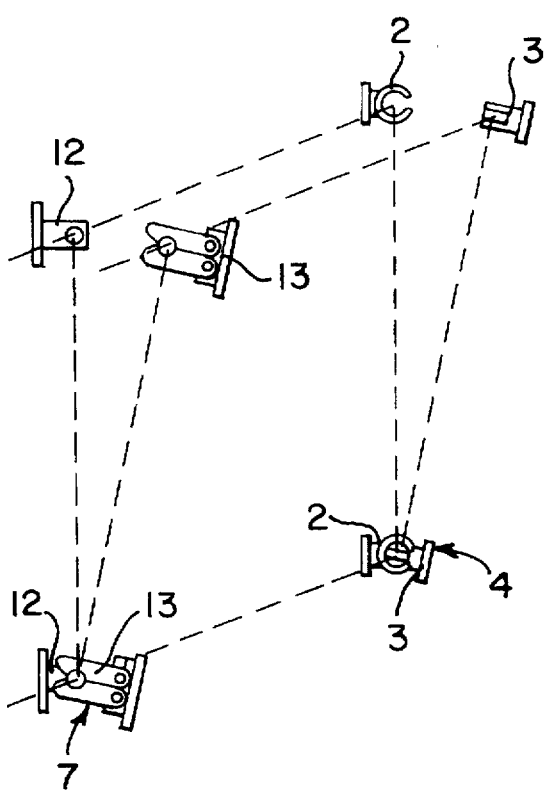

The hinge assembly 4 and the locking mechanism 7 are disposed between the opening 5 and the door 6 on the vehicle C. When the door 6 is closed as shown in FIG. 3(a), the pin 12 and the engaging member 13 of the locking mechanism are in engagement to hold the rotation member 10 of the male hinge 3 in the state of being fit in the cylindrical member 8 of the female hinge 2. In other words, the locking mechanism 7 prevents the rotation member 10 from escaping from the cylindrical member 8 through the insertion bore 9 and holds the rotation member 10 rotatably in the cylindrical member 8. Hence, as exemplified in FIG. 3(b), the upper locking mechanism 7 is released from the locking state to allow the rotation member 10 to be moved away from the cylindrical member 8 through the insertion bore 9, thereby enabling the door 6 to be opened. In this case, the other combination of the hinge assembly 4 and the locking mechanism 7 at the lower side of the door constitute an axle of rotation for the door. The female hinge 2 or the male hinge 3 of the hinge assembly 4 may be provided at either the opening 5 or the door 6, which arrangement is not limited. For the locking mechanism structured as in this example, a control lever having a wire is provided on the door 6. Hence, it is preferable to provide the pin 12 at the opening 5 and the engaging member 13 at the door 6.

Figure 4:
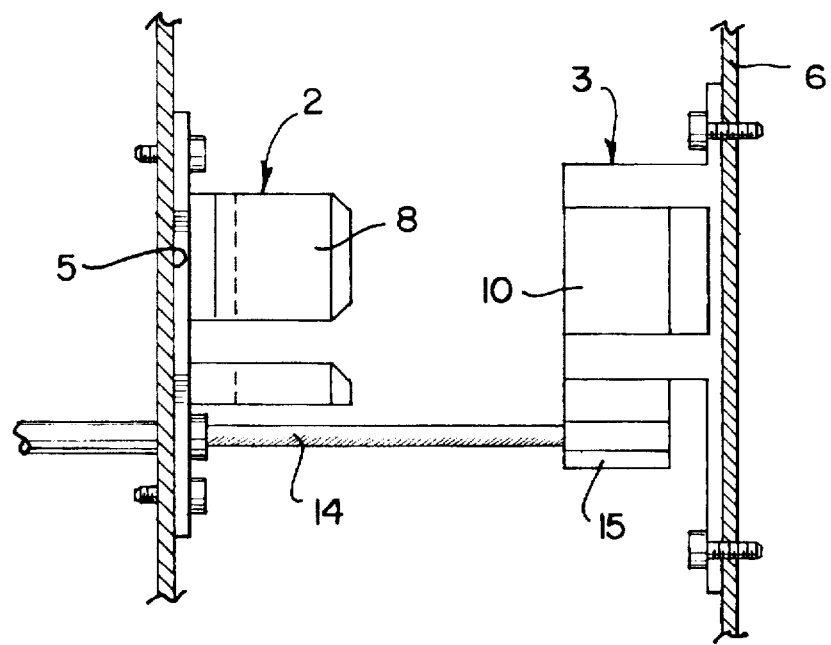
FIG. 4 is a plan view showing a further example of the locking mechanism.

FIG. 4 shows a further example of the structure 1 for opening the vehicle door at the upper and lower sides according to the present invention. The door 6 is closed and opened at the upper side by pulling in and drawing out a wire 14. The locking mechanism 7 is so structured that the wire 14 is retained by a wheel 15 which is coaxial with the rotation member 10 of the male hinge 3 and supported to be rotatable. The wheel 15 which is provided integrally with the male hinge 3 in this example may be separately provided on the door 6. The locking mechanism functions in such manner that the wire 14 is pulled in to close and lock the door 6 so that the rotation member 10 is held rotatably in the cylindrical member 8 of the female hinge 2.

Figure 5A:
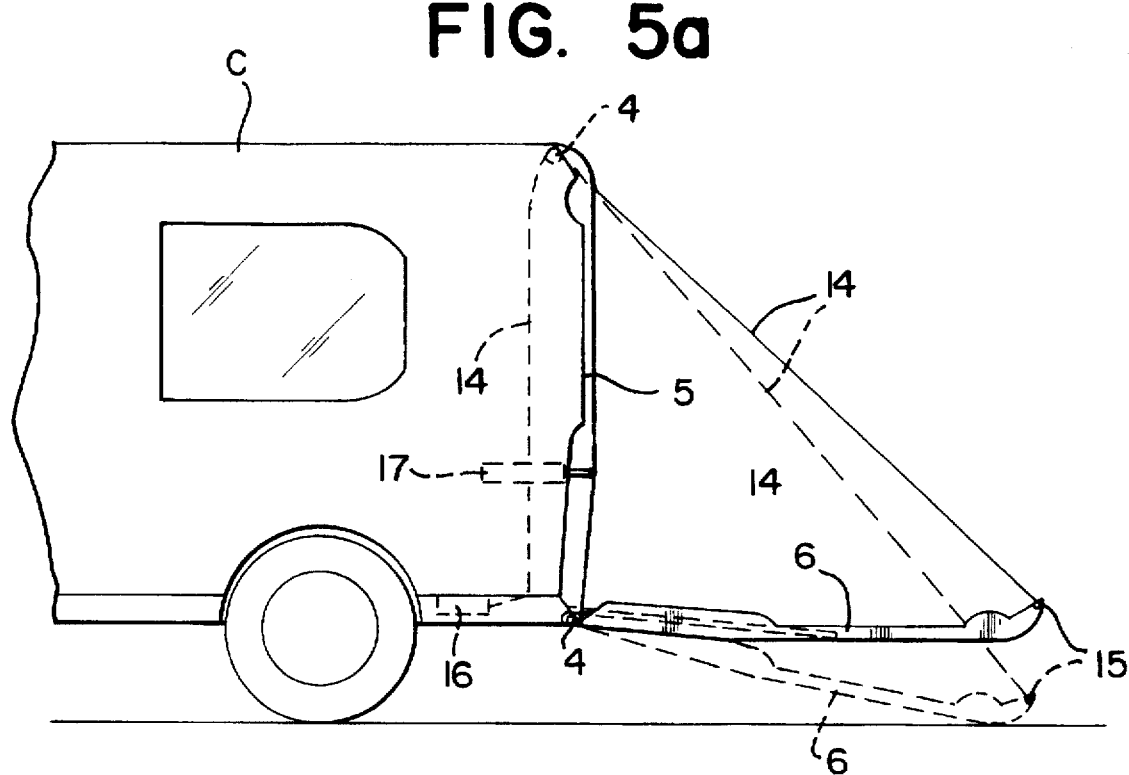
FIG. 5(a) is a side view of a door being opened at the upper side by means of the locking mechanism shown in FIG. 4, FIG. 5(b) a schematic rear view showing setting of a wire and other components.
Figure 5B:
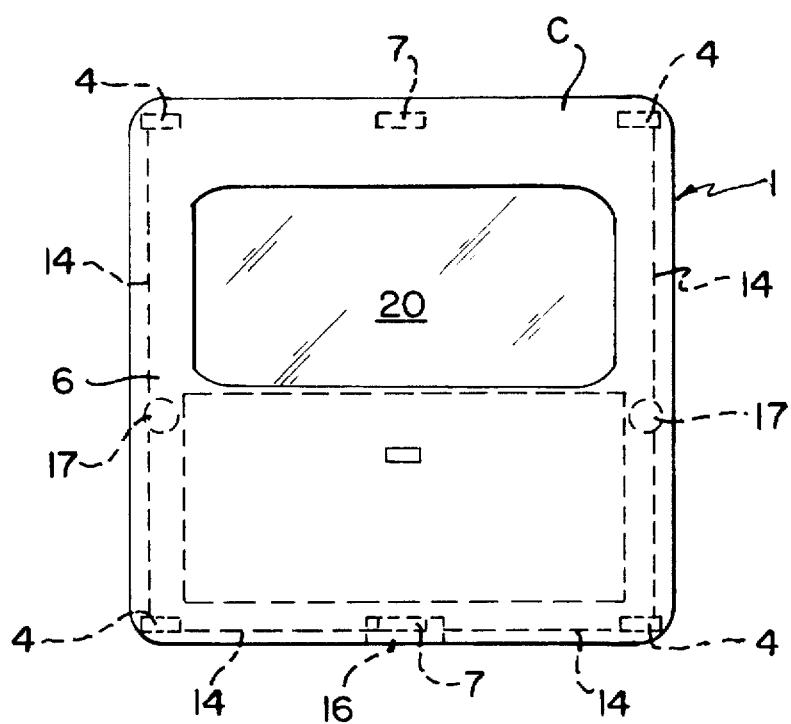

Opening and closing the door 6 using the wire 14 is carried out as seen in FIG. 5(a). A door 6 designated by the solid line serves as a floor and the same by the dotted line does as a slope for a wheelchair, etc. The wire 14 is drawn out from both ends of the upper side of an opening 5 on the vehicle body, as seen in FIG. 5(b), and is connected at a remote end with a wire winding device 16 on the vehicle's floor through the inside of the vehicle body. The wire 14 is wound by the wire winding device 16 to close the door 6 and keep the same locked. The wire 14 is drawn out to open the door 6. This mechanism is very effective for a large and heavy door 6 of a large vehicle.

Figure 6:
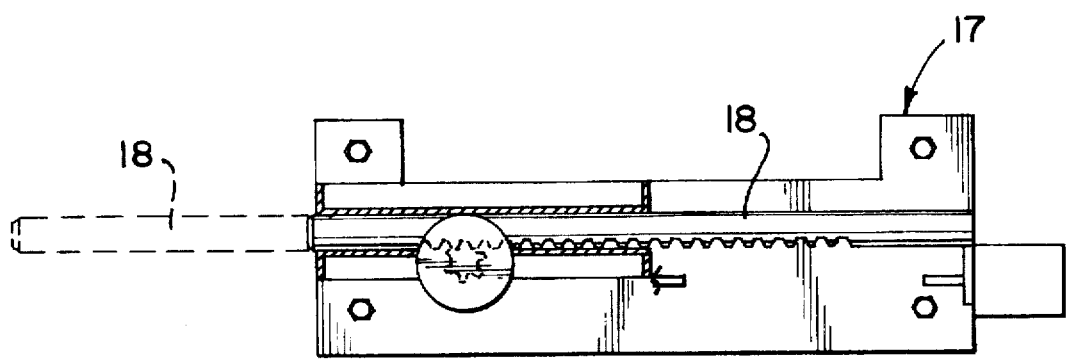
FIG. 6 is a side view showing an example of a device for pushing out the door.
Figure 7:
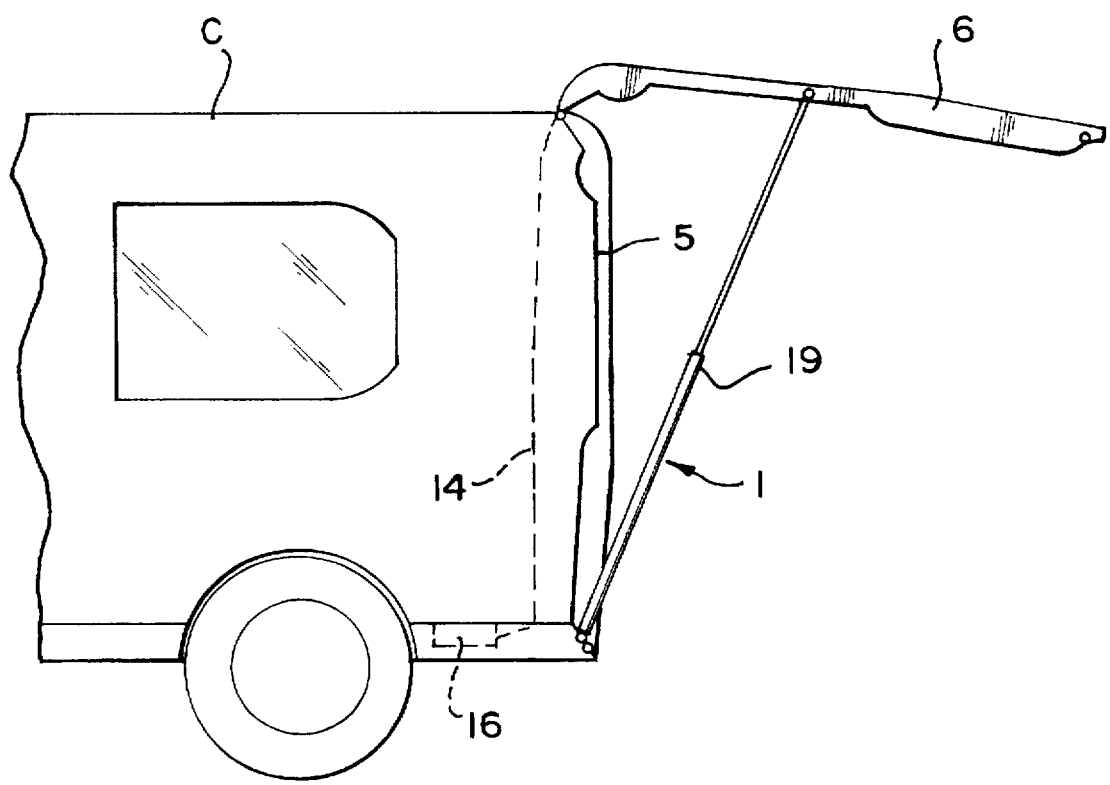
FIG. 7 is a side view of a door mounting a pneumatic damper.
Figure 8:
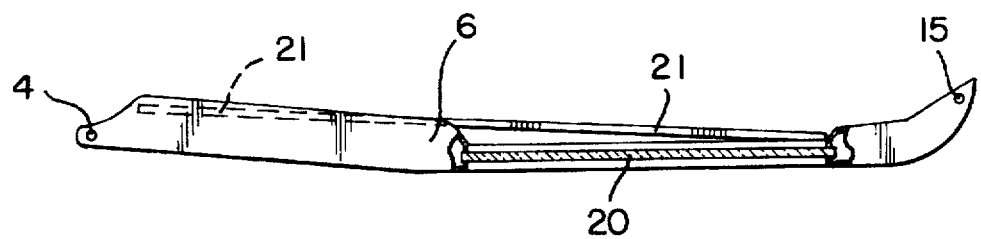
FIG. 8 is a side view of a door mounting a protector for glass of a windshield.

A door push-out device 17 is disposed at both lateral sides of the opening 5 and operated when the wire 14 is drawn out by the wire winding device 16 for opening the door 6. In detail, in case that the door 6 has the center of gravity in or nearer the vehicle body C but not or than the outside, the door 6 is not readily opened even when the wire 14 is drawn out. Hence, in association with the operation of the wire winding device 16 the door push-out device 17 is operated to push out the door 6 until the door becomes open by its weight. The door push-out device 17 may use a push-out pin 18 with a rack and pinion mechanism to cause the push-out pin 18 to project as shown in FIG. 6, or alternatively may be structured merely with a spring members The door 6 is preferably provided with a pneumatic damper (gas damper) 19 which supports or keeps the door opened as seen in FIG. 7 or assists opening the door. A protector 21 for glass may be provided for a windshield (glass) 20 on the door 6 as shown in FIG. 8. The protector 21 is usually accomodated on the door 6 and drawn out to cover and protect the windshield 20 when the door 6 is used as a floor or a slope.

Figure 9:
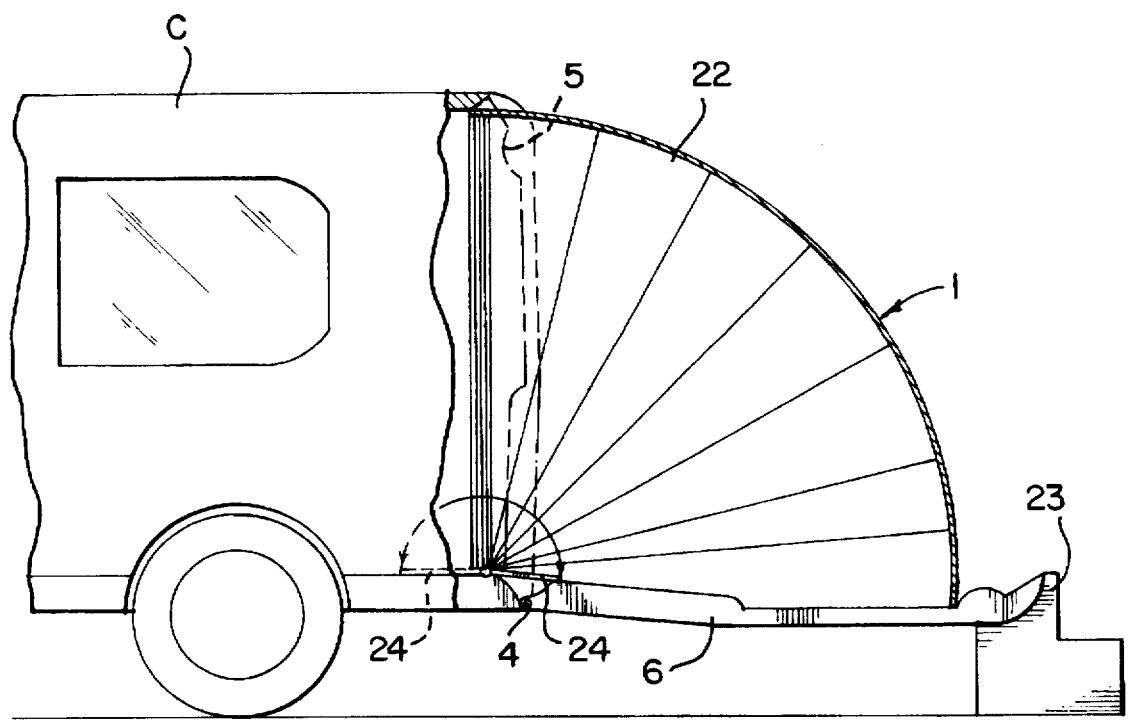
FIG. 9 is a side view of a door connected with a bellows-like tent provided on the vehicle.

FIG. 9 shows an example of provision of a fan-shaped bellows-like tent 22 at a junction between the door 6 and the opening 5. The door 6 opened at the upper side by the door opening structure 1 according to the present invention may be set as a floor to have a living space thereon by use of the bellows-like tent 22, which use is quite effective for a camping site. In this case, a support 23 having steps as shown may be used to support the free end of the door 6, enabling persons to readily go in and out the bellows-like tent 22 at the steps of the support 23. Even when the door 6 assembled with the tent is opened at the lower side, there is no trouble in use of the door. The bellows-like tent 22 when not to be used is merely disconnected from the door 6, without being removed, to allow the door 6 to be the door having the function of being opened at the upper and the lower sides. Furthermore, a flat-floor plate 24 may be provided to make a flat surface on the gap between the vehicle body C and the door 6.

EFFECT OF THE INVENTION

As seen from the above, the structure for opening vehicles' doors at the upper and the lower sides according to the present invention is provided for opening and closing an opening formed on the vehicle by opening a door, which covers the opening, at and about the upper or the lower side, comprising a hinge assembly including a pair of a female hinge and a male hinge, the female hinge having a cylindrical body with an insertion part extending through the periphery of the cylindrical body in its axial direction, the male hinge having a rotation member inserted into the female hinge through the insertion part to be rotatable on the inner peripheral surface of the female hinge and a support supporting the rotation member, the hinge assembly being disposed between near the opening and the door at their upper and the lower sides, and a locking mechanism provided between near the opening and the door at their upper and lower sides and having a rotation axle extending in the direction of a rotation axis of the hinge assemblies at the upper and the lower sides of the door and the opening, the locking mechanism holding the rotation member of the male hinge rotatably in the female hinge of the hinge assemblies. Hence, the present invention enables that the door provided on the vehicle is provided with the upper and lower sides opening structure by use of a quite simple feature and at a low cost.

Hence, the vehicles doors which hitherto does not at all make contribution to practicality are opened at the upper side to be usable as a floor, a slope, steps, etch, thereby enabling persons on the wheelchairs or disabled of their legs to readily get on and off the vehicle. In addition, the door is usable also as a general lower side openable door as conventionally, and is applicable to broad use without spoiling practicality. Furthermore, the characteristic features of the invention, i.e., the hinge assembly and the locking mechanism are separately formed from each other and have high strength at the part pivotally supporting the door, so that the locking mechanism part is substantially not applied with load upon opening and closing the door. Hence, any locking mechanism broadly put in use now with a simple structure may be employed for the invention. Those are quite useful effects provided by the present invention.

What I claim is:

1. A structure for opening doors of vehicles at upper and lower sides of the doors, provided for opening a door of a vehicle, which covers an opening formed on the vehicle, at and about at least one of the upper side and the lower side of the opening to open and close the opening, comprising a hinge assembly including a female hinge and a male hinge, the female hinge having a cylindrical body with an insertion part extending through a periphery of the cylindrical body in its axial direction, the male hinge having a rotation member inserted into the female hinge through the insertion part to be rotatable on an inner peripheral surface of the female hinge and a support supporting the rotation member, the hinge assembly being disposed between the upper and the lower sides thereof, and a locking mechanism provided between the opening and the door at the upper and lower sides thereof and having a rotation axle extending in the direction of a rotation axis of the hinge assembly at the upper and the lower sides of the door and the opening, the locking mechanism holding the rotation member of the male hinge rotatably in The female hinge of the hinge assembly.

2. A structure for opening doors of vehicles at upper and lower sides of the doors as set forth in claim 1, wherein the door is provided with a protector for a windshield formed on the door, said protector covering the windshield at the inner side of the door and is slidable.

3. A structure or opening doors of vehicles at upper and lower sides of the doors as set forth in claim 1, wherein the locking mechanism is a combination of a pin and an engaging member engageable with the pin to be rotatable about the pin.

4. A structure for opening doors of vehicles at upper and lower sides of the doors as set forth in claim 1, wherein the locking mechanism provided at the upper side of the door is so structured that a wire, which is pulled in and drawn out a vehicle body, is retained by a wheel which is disposed laterally of at least one of the male and female hinges of the hinge assembly provided on the door and is supported to be rotatable about an axis extending in a direction of a rotation axis of one of said male and female hinges.

5. A structure for opening doors of vehicles at upper and lower sides of the doors as set forth in claim 4, wherein the vehicle body is provided with a wire winding device.

6. A structure for opening doors of vehicles at upper and lower sides of the doors as set forth in claim 4, wherein a door push-out device which is operated upon drawing out the wire is provided near the opening.

* * * * *